(12) United States Patent
Billo

(10) Patent No.: US 7,852,230 B2
(45) Date of Patent: Dec. 14, 2010

(54) METHOD OF COMMUNICATION AND HOME AUTOMATION INSTALLATION FOR ITS IMPLEMENTATION

(75) Inventor: Fabio Billo, Dueville (IT)

(73) Assignee: BFT SpA, Schio (IT)

( * ) Notice: Subject to any disclaimer, the term of this patent is extended or adjusted under 35 U.S.C. 154(b) by 1419 days.

(21) Appl. No.: 11/236,171

(22) Filed: Sep. 27, 2005

(65) Prior Publication Data

US 2006/0079971 A1    Apr. 13, 2006

(30) Foreign Application Priority Data

Sep. 27, 2004    (EP) ................................. 04425714

(51) Int. Cl.
*G08C 19/00*    (2006.01)
(52) U.S. Cl. ........................ 340/825.62; 700/9; 370/389
(58) Field of Classification Search ............ 340/825.62; 370/389, 348, 443, 445; 700/9
See application file for complete search history.

(56) References Cited

U.S. PATENT DOCUMENTS

| | | | | |
|---|---|---|---|---|
| 3,787,665 | A * | 1/1974 | Watson et al. ................ 370/507 |
| 4,471,480 | A * | 9/1984 | Haussmann et al. ......... 370/242 |
| 4,621,170 | A | 11/1986 | Picandet |
| 4,760,487 | A * | 7/1988 | Kwong et al. ................. 361/64 |
| 4,788,527 | A | 11/1988 | Johansson |
| 4,799,062 | A * | 1/1989 | Sanderford et al. ......... 342/450 |
| 5,410,292 | A * | 4/1995 | Le Van Suu ................. 370/479 |
| 5,418,526 | A * | 5/1995 | Crawford .................... 370/464 |
| 5,436,851 | A * | 7/1995 | Shimotsuma et al. .. 340/825.25 |
| 5,631,757 | A * | 5/1997 | Bodeep et al. .............. 398/138 |
| 5,905,716 | A * | 5/1999 | Vidales ........................ 370/276 |
| 5,990,638 | A * | 11/1999 | Aoyama et al. ............... 318/85 |
| 7,043,611 | B2 * | 5/2006 | McClannahan et al. ..... 711/154 |
| 7,081,830 | B2 * | 7/2006 | Shimba et al. ......... 340/825.62 |
| 7,157,885 | B2 * | 1/2007 | Nakagawa et al. ............ 322/28 |
| 7,184,501 | B1 * | 2/2007 | Fukuda ........................ 375/354 |
| 7,400,239 | B2 * | 7/2008 | Kiko et al. ................... 340/501 |
| 2002/0061016 | A1 * | 5/2002 | Mullaney et al. ............ 370/384 |

(Continued)

FOREIGN PATENT DOCUMENTS

EP    0 443 103 A2    8/1991

(Continued)

OTHER PUBLICATIONS

Tracy McHenry, "Using the HC912B32 to Implement the Distributed Systems Interface DSI Protocol", Aug. 1999, Freescale Semiconductor (Motorola), AN1816D, pp. 1-24.*

(Continued)

*Primary Examiner*—George A Bugg
*Assistant Examiner*—Bradley E Thompson
(74) *Attorney, Agent, or Firm*—Husch Blackwell LLP Welsh Katz

(57) ABSTRACT

The method of communication is intended to be implemented in a home automation installation for motorized maneuvering of a moveable element for closure, for privacy or for solar protection or of a screen including a master unit and at least one slave unit linked to an electrical device, the master unit and the slave unit or units being connected to an information transmission bus. The slave unit responds to a message emitted by the master unit for the duration of emission of this message.

16 Claims, 4 Drawing Sheets

U.S. PATENT DOCUMENTS

| | | | |
|---|---|---|---|
| 2004/0249903 A1* | 12/2004 | Ha et al. | 709/208 |
| 2005/0104377 A1* | 5/2005 | Nakagawa et al. | 290/40 A |
| 2005/0280422 A1* | 12/2005 | Kishibata et al. | 324/522 |
| 2006/0079971 A1* | 4/2006 | Billo | 700/90 |
| 2007/0061406 A1* | 3/2007 | Baek et al. | 709/208 |
| 2007/0108919 A1* | 5/2007 | Tsai et al. | 315/291 |
| 2007/0167179 A1* | 7/2007 | Shamoon et al. | 455/466 |
| 2007/0268121 A1* | 11/2007 | Vasefi et al. | 340/506 |
| 2008/0153423 A1* | 6/2008 | Armstrong et al. | 455/67.14 |

FOREIGN PATENT DOCUMENTS

| | | |
|---|---|---|
| EP | 0 507 365 A2 | 10/1992 |
| EP | 0 604 167 A1 | 6/1994 |
| FR | 2 518 858 | 6/1983 |
| FR | 2 741 496 | 5/1997 |
| GB | 1 360 605 | 8/1971 |
| WO | WO 01/54298 A1 | 7/2001 |
| WO | WO 03/075105 A1 | 9/2003 |
| WO | WO 03/075105 A1 * | 9/2003 |
| WO | WO 03/104907 A1 | 12/2003 |
| WO | WO 03/104907 A1 * | 12/2003 |

OTHER PUBLICATIONS

European Search Report EP 04 42 5714; dated Mar. 11, 2005.
XP-002311480; Freescale Semiconductor, Inc.; Motorola Semiconductor Application Note AN1816; By Tracy McHenry; dated Aug. 1999.

* cited by examiner

METHOD OF COMMUNICATION AND HOME AUTOMATION INSTALLATION FOR ITS IMPLEMENTATION

FIELD OF THE INVENTION

The invention relates to a method of communication in a home automation installation for motorized maneuvering of a moveable element for closure, and for privacy or for solar protection.

BACKGROUND OF THE INVENTION

In the field of home automation, moveable elements, such as in particular doors, blinds, shutters, screens, barriers or gates, are maneuvered by virtue of electrical actuators. An actuator generally includes an electric motor, and is linked to an electronic unit for managing the power supply to the motor. The actuator is supplied by an ac voltage source (for example 230 volts) or by a dc voltage source (for example 24 volts).

An electrical actuator is usually linked or may be linked to various electrical devices making it possible to perform particular functions of control of the actuator (termed "input functions"), functions of information (for example of the user) or of security, some of which are imposed by the security standards pertaining to the field of home automation, these information or security functions being termed "output functions." These electrical devices may in particular be photoelectric cells, sensors, receivers of RF waves, flashing lamps, emergency stop buttons and digicodes.

The electronic management unit normally includes a supply circuit, a logic control unit, supply control circuits for controlling the motor and interface circuits for connecting various electrical devices. The unit may be a physical entity separate from the actuator.

The multiplicity of these electrical devices makes the installation and the wiring of such systems relatively difficult. This gives rise to a high cost and often leads to numerous errors.

To remedy this problem, it is known to link the electronic management unit and the various necessary peripheral electrical devices by way of a transmission bus. The architecture of such a system makes it possible to ensure the same functionalities as those performed by a system in which the electronic unit centralizes the connections and the information.

Such buses are found in various patents or patent applications.

DESCRIPTION OF THE PRIOR ART

Application WO 03/104907 discloses an installation for controlling the movements of a gate or of a door comprising a bus for electrical energy supply and information transmission, a unit for electrical supply and sending/receiving information and at least three other units. A first unit is intended to control the electrical supply to a motor driving the gate or the door, a second unit is linked to an interface for controlling the movements of the door and a third unit is linked to a security device.

Application WO 89/04578 discloses a network including various identical cells capable of fulfilling one or more of the following functions: detection, control and communication. They are linked by a bus that may in particular be embodied by a pair of twisted conductors or a powerline carrier network.

U.S. Pat. No. 4,788,527 discloses a network for transmitting information between sensors and remote monitoring cells via a dc bus with two conductors and simultaneously transmitting the supply for the various elements.

Application No. FR 2 741 496 discloses a low voltage home automation network for the control of electrical devices.

Application EP 0 507 365 discloses a network having a data transmission and supply bus for controlling various devices of motorized screens.

In the case where use is made of such a bus in a secure network, it is necessary to make sure that the information transmitted is transmitted correctly and that it is also received correctly by the proper recipient. A high quantity or frequency of data transmitted leads to rapid saturation of the bus and to poor emission or reception of the data at the level of the various elements of the network. The use of the same cables for the supply and for the transmission of the data may also cause disturbances prejudicial to the transfer of data.

Such a problem of integrity of transmission is tackled in patent application No. WO 03/104907. The solutions envisaged for addressing same are as follows:

use of a precise identifier for each unit,
use of a master/slave configuration, the slave units then waiting to be interrogated by the master unit in order to emit a response in their turn,
feedback of information in the form of a simple acknowledgement of receipt or of a confirmation message,
duplication of those of the messages that have a certain priority so as to limit the problem induced of the increase in the data traffic,
use of a procedure for monitoring the integrity of the frame (checksum or cyclic redundancy check).

These latter solutions tend to increase the length of frames of the messages and hence to increase the use of the hardware resources. They consequently only partially address the above mentioned problems.

A network of elements linked by a bus is also known from the document entitled "Using The HC912B32 To Implement The Distributed Systems Interface (DSI) Protocol" published by Motorola, Inc and the substance of which is incorporated by reference into the present application. This network comprises a master unit and slave units. The information is transmitted by duplex communications between the master unit and the slave units. The information emitted by the master unit is voltage modulated whereas the information emitted by the slave units is current modulated. The response of a slave to a command of the master unit takes place during the transmission of the next command.

In the same way, patent application No. WO 01/54298 discloses a device enabling duplex communication between two electronic units linked together by a bus.

Patent application No. EP 0 443 103 discloses a device for the communication between two electronic units using three wires. A first wire is used to transmit a data signal, a second wire is used to transmit a clock signal and the third wire is used to transmit an acknowledgement signal. For the sole purpose of exchanging data, this device requires a bus having at least three wires.

Patent application No. WO 03/075105 discloses a method for the communication between two products (a computer and an electronic device), in which a product does not respond to a message emitted by the other product for the duration of emission of this message.

SUMMARY OF THE INVENTION

The aim of the invention is to provide a method of communication that improves the known methods and overcomes the above mentioned drawbacks. In particular, the method of communication must be simple, fast, ensure full transmission of the data, economize on the resources of the network and make it possible to identify the various units without error. The method according to the invention must furthermore allow communication between a motorized device for maneuvering a moveable element of a building and elements for control of this device or security elements. The aim of the invention is also to provide electronic units termed "master" and "slave" units, making it possible to implement the method of communication and an installation including such units.

Included is a screen having a master unit and slave units linked to electrical devices, the master unit and the slave units being connected to an information transmission bus. It also relates to a home automation installation for motorized maneuvering of a moveable element for closure, for privacy or for solar protection or of a screen, a master unit controlling the supply to an electric motor for maneuvering a moveable element for closure, for privacy or for solar protection or a screen and a slave unit intended to be linked to such a master unit.

The method of communication according to the invention includes message emitted by the master unit having the identifier of a recipient slave unit, where the recipient slave unit responds to the message for the duration of emission of this message.

DESCRIPTION OF THE DRAWINGS

The appended drawing represents, by way of example, a mode of execution of the method of communication according to the invention and an embodiment of an installation making it possible to implement this method.

DESCRIPTION OF THE INVENTION

Figure 1:
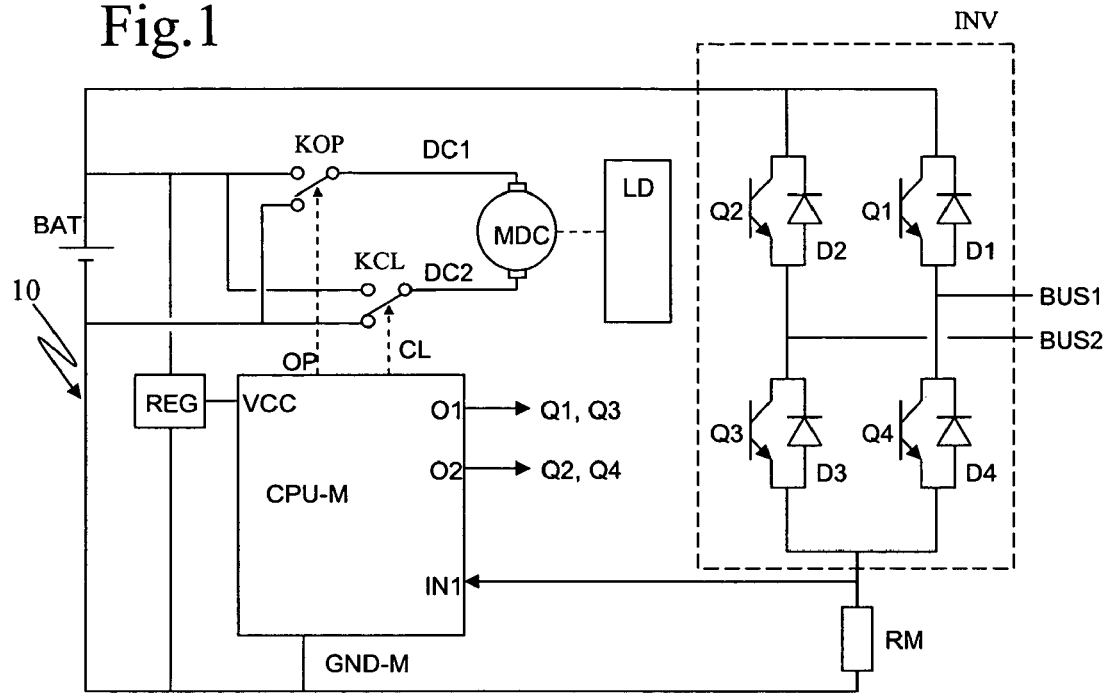
FIG. 1 is a diagram of an embodiment of a master unit according to the invention.
Figure 2:
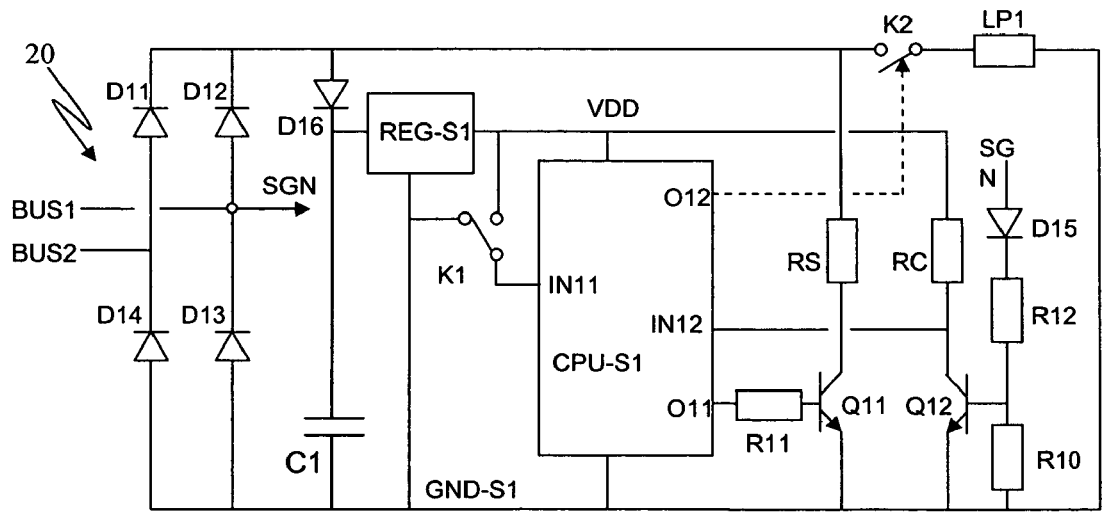
FIG. 2 is a diagram of an embodiment of a slave unit according to the invention.

A master unit 10 and a slave unit 20 of an installation according to the invention are respectively represented in FIGS. 1 and 2. In the subsequent description, the master unit is also referred to as the "electronic unit" and the slave units are referred to as "accessories". The units are termed "master" and "slave" only with respect to their communication protocol and not necessarily with respect to their functional relations in the installation.

The master unit 10 and the slave unit 20, or the slave units, communicate via a wire based bus with two conductors BUS1 and BUS2. In the embodiment represented, the wire based bus is also used to supply each of the slave units, under an ac voltage, however it is possible to separate the supply and communication functions, at the price of more complex cabling.

The master unit 10 is supplied by a continuous generator BAT. It may be an accumulator battery, for example recharged by a photovoltaic panel, but it may also be the output of an ac/dc converter whose input is supplied via the electrical ac network (not represented). The output voltage of the dc generator BAT is for example 24 V. The negative pole of the generator is wired up to an electrical ground GND-M of the master unit 10.

Preferably, the master unit 10 comprises an actuator MDC allowing the displacement of a moveable element LD such as a door, a barrier, a gate, a shutter or a screen. In the embodiment described, this actuator is a dc current motor MDC. However, an ac current motor, for example a monophase induction motor, may be equally suitable if it can be supplied directly by an ac supply source.

The motor is supplied so as to rotate in a first direction or in a second direction with the aid of two relays KOP and KCL whose reversing contacts have been represented. These relays are controlled by two outputs OP and CL of a microcontroller CPU-M.

In the case of an ac motor supplied by a separate network, the relays KOP and KCL are linked to this ac network. It should be noted that other elements could be used to command the motor, for example an inverter or a thyristor.

The microcontroller CPU-M is supplied at a reduced dc voltage VCC, for example 5 volts, by connection to the output of a regulator REG whose two inputs are wired to the dc generator BAT.

The master unit also comprises an inverter circuit INV. This circuit comprises an H bridge formed by four controlled breakers Q1 to Q4. The control electrodes of these breakers Q1 and Q3 are wired to one and the same first output O1 of the microcontroller CPU-M and the control electrodes of the breakers Q2 and Q4 are wired to one and the same second output O2 of the microcontroller CPU-M. The outputs O1 and O2 are not activated simultaneously. The point common to the controlled breakers Q1 and Q4 is connected to the conductor BUS1 and the common point to the controlled breakers Q2 and Q3 is connected to the conductor BUS2.

Preferably, the bus cable is a twisted pair. On account of the partially inductive nature of the link to the slave units, or on account of the inductive nature of the slave units themselves, freewheel diodes D1-D4 are disposed in parallel with the controlled breakers Q1-Q4. These diodes are intrinsic if MOS transistors are used as controlled breakers.

A resistor RM of low value serves as resistor for measuring the strength of the current flowing at a given instant in the inverter, hence in the bus. For example, the resistor RM equals 1 ohm, and the voltage across its terminals reaches 1 volt if the total current flowing to the slave units equals 1 ampere.

Under these conditions, and for a generator voltage equal to 24 V, a voltage of +23 V is present across the terminals of the bus when the first output O1 is active, whereas a voltage of −23 V is present when the output O2 is active. The use of an ac voltage on the bus line doubles the amplitude of the signal, thereby considerably improving the immunity to noise.

The measurement resistor RM is linked to the electrical ground GND-M, and the voltage across the terminals of the measurement resistor RM is applied to a measurement input IN1 of the microcontroller CPU-M, typically an analog/digital converter input. In this way, the current flowing in the bus and supplying the slave units is measured by the master unit.

The measurement of the current in the resistor RM is also used for the detection of collisions if several slave units are seeking to communicate simultaneously with the master unit.

The slave unit comprises a microcontroller CPU-S1, supplied with the aid of a slave regulator REG-S1, itself supplied on the basis of the voltage available on the bus, rectified by a diode bridge D11-D14 and filtered by a capacitor C1. The common anodes of the rectifier bridge are linked to an electrical ground of the slave GND-S1. The electrical grounds of the slave units and of the master unit are not wired together. The capacitor C1 is placed between the electrical ground GND-S1 and the cathode of a diode D16. The anode of the diode D16 is wired to the common cathodes of the rectifier bridge. The input terminals of the regulator REG-S1 are also wired up to the terminals of the capacitor C1. As is known to the person skilled in the art, a resistor of low value, not represented, may be placed in series with the diode D16, in such a way as to avoid an overly large current in the diodes and/or in the bus when a slave unit whose capacitor is not charged is wired up. This resistor also has the function of limiting the current during the reversal of polarity on the bus due to the voltage modulation.

The output of the regulator (typically 5 volts) is wired up to a positive supply line VDD, linked to the microcontroller CPU-S1. The positive supply line VDD is also linked to a terminal of a collector resistor RC of an arrangement with transistor Q12 operating as a logic inverter and voltage adapter. The second terminal of the resistor RC is wired to the collector of the signal transistor Q12 and to a second logic input IN12 of the microcontroller.

The transistor Q12 is commanded by the voltage taken between the conductor BUS1 and the electrical ground of the slave unit GND-S1. Between these two points are disposed in series a diode D15, a base resistor R12, wired to the base of the signal transistor Q12, and a blocking resistor R10, disposed between the base and the emitter of the signal transistor Q12. When the voltage between the conductor BUS1 and the conductor BUS2 is negative, the diode D15 is off, and the transistor Q12 is equally blocked. The potential of the second input IN12 is then that of the positive supply line VDD, this corresponding to a high logic state of this input.

Conversely, when the voltage between the conductor BUS1 and the conductor BUS2 is positive, the diode D15 conducts, as does the base-emitter junction of the signal transistor Q12 which becomes saturated if the base resistor R12 is weak enough. The signal transistor Q12 then behaves as a short-circuit between collector and emitter and the second input IN12 takes the potential of the electrical ground GND-S1, this corresponding to a low logic state.

Thus, the microcontroller CPU-S1 is aware at any instant of the polarities of the bus, this allowing the transfer of voltage-modulated information from the master unit to the slave unit. This information is contained in an electrical signal generated by the switchings of the breakers Q1, Q2, Q3 and Q4 controlled by the outputs O1 and O2 of the microcontroller CPU-M. This information may thereafter be processed by the microcontroller CPU-S1.

Conversely, the slave unit 20 can modulate the current that it absorbs by connecting or disconnecting an element RS consuming electrical energy. This element is for example a simple resistor placed between the common anodes of the rectifier and the collector of a power transistor Q11 whose emitter is linked to the electrical ground GND-S1. The base of this transistor is wired up to a first output O11 of the microcontroller CPU-S1 across a resistor R11. When the first output O11 passes to the high state, current flows through the resistor RS, which gets added to the current already flowing for supplying the slave unit 20. This current is measurable by the master unit at the level of the input IN1 of the microcontroller CPU-S1 measuring the voltage across the terminals of the measurement resistor RM. Thus, current-modulated information may be transmitted from the slave unit to the master unit. This information may thereafter be processed by the microcontroller CPU-M.

The role of the diode D16 is to prevent part of this current absorbed by the element RS from being provided by the capacitor C1, which would impair the transmission of information to the master unit.

If the microcontroller so permits, the resistor R11 and the transistor Q11 are integrated in the form of an "open collector" output. The resistor RC may also be integrated, just like the transistor Q12. The slave circuit is then particularly simple.

The slave unit 20 comprises an input type function and an output type function. The input type function makes it possible for an action of the slave unit to have as consequence an action of the master unit while the output type function allows an action of the slave unit to be the consequence of an action of the master unit.

In the slave unit 20, an input type function is performed by an inverter K1 making it possible to link an input IN11 of the microcontroller CPU-S1 to the positive output of the regulator REG-S1 or to the ground GND-S1. The inverter K1 is for example a control button on which each pulse is intended to give an order to move the moveable element LD, according to a cycle with four stages: Open, Stop, Close, Stop.

In the slave unit 20, an output type function is performed by a breaker K2 controlled by an output O12 of the microcontroller CPU-S1 acting on an electrical receiver. The breaker K2 may for example control the flashing of a signaling lamp LP1 serving for example to warn of a danger upon the closure of the moveable element LD. The signaling lamp LP1 is supplied through the breaker controlled by the voltage available across the terminals of the rectifier. It is also possible to supply this lamp or the electrical receiver directly on the supply and communication bus, between the conductors BUS1 and BUS2 if this electrical receiver accepts an ac voltage and if the controlled breaker K2 exhibits, like a relay does, galvanic isolation of its control. The breaker K2 could supply electrical receivers of any other type as replacement for the signaling lamp LP1.

Thus, it is conceivable for the motor driving the moveable element to itself be wired to a slave unit. In this case, the breaker K2 would become of multipole type, and would allow the connection of the motor to a separate energy source.

The slave unit may exhibit various output type functions. In this case, the microcontroller CPU-S1 exhibits as many control outputs (of the type of the output O12 represented) as output type functions. These outputs control controlled breakers commanding the supply to the various electrical devices making it possible to perform various functions.

A second capacitor could be supplied across a diode and a resistor, forming a circuit (not represented) parallel to the assembly constituted by the capacitor C1 and the diode D16. Such a capacitor would serve as electrical energy reserve for supplying an electrical device whose use is intermittent. This capacitor would charge up slowly on the bus during the periods in which the electrical receiver is not activated.

Likewise, the slave unit may exhibit various input type functions. In this case, the microcontroller CPU-S1 exhibits as many control inputs (of the type of the input IN11 represented) as input type functions. The state of the inputs is controlled by various means making it possible to perform these various functions.

If an element is furnished with several functions (for example the functions "open", "close" and "STOP" obtained respectively via an open control button, a close control button and a stop control button), each function is tagged by its own identifier and hence considered to be a distinct unit.

The slave unit 20 described allows several functions of input type and of output type to share the same hardware resources in one and the same physical assembly wired up to the bus. In this case, a single rectifier bridge, a single filtering capacitor, a single regulator and a single microprocessor are used. A single inverter circuit comprising the signal transistor Q12 is also shared, as are the element RS and the power transistor Q11. It is on the other hand necessary to provide as many inputs on the microcontroller CPU-S1 as there exist "input" functions and to provide as many outputs on the microcontroller CPU-S1 as there are "output" functions.

However, it is clear that the benefit of the communication protocol and of the installation allowing its implementation is to likewise easily allow the delocalization of the functions.

Control Messages

Figure 3:
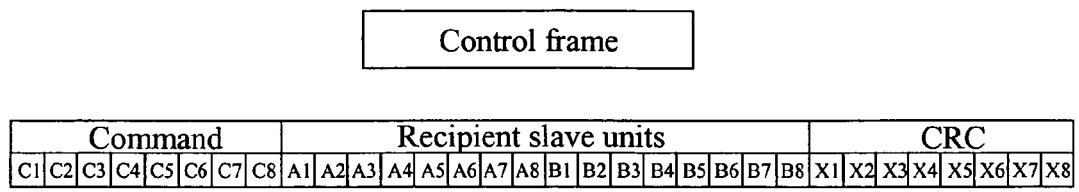
FIG. 3 is a diagram of a control frame emitted by the master unit.

In the method of communication according to the invention, the master unit emits control frames comprising for example 4 information bytes. Each frame is introduced by a (not represented) frame start bit. As represented in FIG. 3, the first byte of the control frame comprises a control code corresponding to an action or a state of an actuator, or of an information or security device linked to a slave unit. The bits of the second and third bytes are associated with the slave units linked to the master unit. In the course of the transmission of a bit of the second or third byte, information may flow simultaneously both from the master unit to a slave unit and from a slave unit to the master unit. The fourth byte comprises the result of a verification calculation (integrity code) pertaining to the content of the preceding three bytes. It is emitted only by the electronic unit.

Each of the 8 bits of the second and third byte (A1 to B8) is therefore specific to an accessory.

The association between a bit of the second or of the third byte and a specific accessory is ensured by a local address, defining the place of a bit of the frame. The electronic unit assigns a local address to each accessory during a configuration method described later.

In the example, the slave unit having the local address equivalent to A1 will be associated with the first bit of the second byte of the frame and the slave unit having the local address equivalent to A8 will be associated with the last bit of this same byte.

The choice of two bytes for the identification of the various slave units is arbitrary. However, it makes it possible to associate 16 slave units (one slave unit per bit), which seems sufficient in a system for motorized maneuvering of a barrier.

16 bits are thus used to represent the local addresses in a control frame, with one bit per address, where the local address is coded on 4 bits (representing 16 possible choices) in a configuration frame which will be seen later.

For example, for a supply frequency of 1 KHz and by considering a frame 4 bytes long (making it possible to communicate with 16 accessories), the transmission of a complete control message (excluding the start of frame bit) takes 32 ms. This time is entirely compatible with the applications typical of this field.

The coding of the frame follows a known format, for example a Manchester coding (a High/Low or Low/High transition per bit transmitted). It may also be of the type presented in the document "Using the HC912B32 to implement the distributed systems interface (DSI) protocol" published by the company Motorola, Inc. Preferably, the coding used is auto-synchronized and its mean value is zero.

Several types of communications are distinguished in the method of communication. On the one hand, the master unit must be able to interrogate the slave units as regards their state. This interrogation concerns mainly the slave units performing a function of input type. On the other hand, the master unit must be able to send a state instruction to a slave unit. This instruction concerns mainly the slave units performing a function of output type.

In response, the slave units must be able to transmit their state, so as to respond to the interrogation or to confirm the registering of a state instruction.

Finally, the master unit must be able to read or compare the states fed back by the slave units so as to deduce therefrom the actions to be implemented.

The functionalities of the communication method allow the master unit to analyze changes of state of the slave units performing an input function so as to implement the associated functions, to monitor the states of the slave units performing an output function so as to check the availability and/or the proper operation of the electrical devices that they control.

A command sent from the master unit to all the various slave units is managed in the course of a single control frame. Each slave unit is identified in the control frame by a particular bit of the second and third byte. To manage the command in the course of a single frame, this implies that in the course of this frame an item of information must be emitted by the master unit toward the slave units and an item of information must be emitted by one of the slave units toward the master unit.

For each slave unit to which the command is addressed, a bidirectional communication occurs in the course of the transmission of the slave unit's identification bit.

Alternatively, the response of the slave unit could occur during the transmission of a subsequent bit within the message frame (for example the bit following the received bit).

The control word, represented by the addresses C1 to C8 in the first byte makes it possible to distinguish the type of communication which takes place. This control word is received and read, at least partially, by all the slave units.

Reaction of the Slave Units Performing an Input Type Function:

Each slave unit performing an input type function must be capable of signaling its state (or its change of state with respect to the last interrogation) to the master unit.

The master unit interrogates the slave units periodically (quasi continuously) so as to ascertain their state or detect by comparison the changes of states of the slave units performing an input type function. When an action of a slave unit, for example an automation facility, performing an input type function or an action exerted on a slave unit performing an input type function is detected, for example if a pushbutton for controlling the movement of the moveable element is pressed, the master unit commands the actuator as a function of the state of the slave unit activated and also manages the various states of the other slave units, for example of the slave units performing output type functions.

Each slave unit responds to the master unit by generating a current pulse representing its state.

The master unit may deliver a second message, identical or not to the first, allowing the slave unit to confirm to the master unit its change of state. In this case, for example, the new state of the slave unit is validated within the master unit only when it has been transmitted twice in succession to the master unit within a given time slot.

Reaction of the Slave Units Performing an Output Type Function:

In a single frame, the master unit transmits to the various slave units performing an output type function, the state that they must retain. This transmission may be carried out periodically or follow an order given by a slave unit performing an input type function.

For example, a safety edge and photoelectric security cells must retain an active "ON" state as soon as a movement of the moveable element is initiated, a fall preventive device should perhaps be permanently active and an indicator light should come on only in very specific situations of the moveable element (for example when an obstacle has been detected).

Each slave unit performing an output type function confirms the receipt of the information, for example by sending an echo of the value received in the bit identifying it, by modifying the current across the conductors of the bus by activation or otherwise of the power transistor Q11.

However, the command is not necessarily executed immediately. Specifically, the slave unit performing an output type function waits to have received the whole of the frame and to have checked the accuracy of the integrity code contained in the fourth byte of the frame before executing the order if this code is correct.

In certain cases described later, a command may be executed before verification of the integrity code.

The verification of a match between a value calculated by the slave units on the basis of the first three bytes of the frame and the value contained in the fourth byte of the frame therefore causes the execution of the command by the slave units performing output functions. This verification may be effected through the use of a cyclic redundancy check (or CRC).

Although reference has been made separately to slave units performing an input or output type function, one and the same control message may manage all the slave units performing an input function and all those performing an output function.

Specific Control Messages:

For certain slave units, it is useful to exchange more than a simple binary state.

For example, if a radio receiver is connected to the bus, it is considered in the installation as a slave unit performing an input function. Each time this receiver detects a radio signal emitted from a radio transmitter of the installation, its state will change: it goes from the inactive "OFF" state to the active "ON" state.

When a control message is emitted by the master unit, the radio receiver signals its change from an inactive state to an active state through the emission of a current impulse. As a consequence, the master unit can then send a specific control message to the radio receiver so as to obtain for example the substance of the radio order transmitted.

Figure 4:
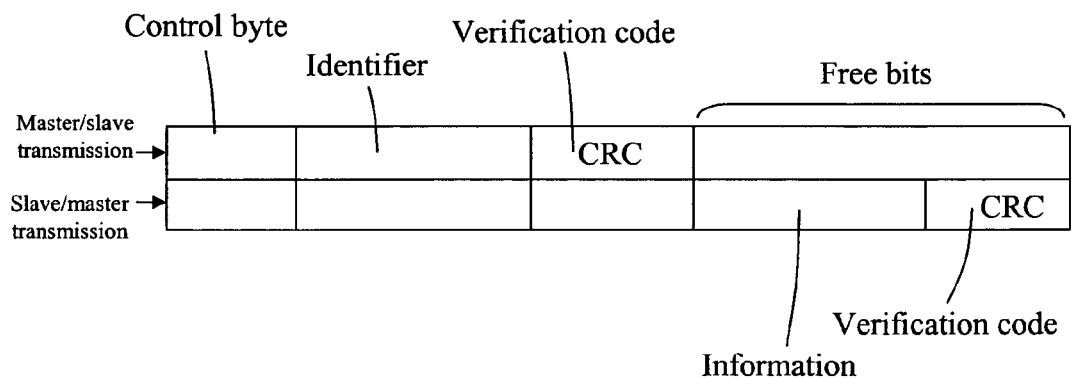
FIG. 4 is a diagram of a specific control frame emitted by the master unit.

In this case, as represented in FIG. 4, the content of the control word signals to the slave units that it is a specific command and that, consequently, the bits of the second and third bytes no longer correspond to bits identifying the slave units. The latter ignore the command or check that the latter is not addressed to them in particular (by use of the identifier of the slave unit).

As represented in FIG. 4, certain bits of the specific control frame are free. The slave unit having received a specific control frame uses the time interval associated with these free bits to send, in current modulation form, information regarding the command received by the radio receiver and/or regarding the identity of the radio transmitter whose command it has received.

In practice, the specific control frames are longer than the conventional control frames, so as to have sufficient free bits for the response of the slave unit within the same message timing. The free bits then serve to synchronize the responses of the slave unit over time.

Two ways of checking the integrity of the specific control frame emitted by the master unit may be implemented:

1. Insofar as the slave unit can provide information to the master unit in the course of the transmission of a frame, the slave unit reads the bits of the CRC integrity code and repeats them identically. At the moment of transmission of the last integrity code bit, the slave unit checks the integrity code. If it proves to be incorrect, it then suffices for the slave unit to modify its response on the last bit. The master unit deduces therefrom that the integrity code is incorrect and re-emits a specific control message.
2. Insofar as certain bits of a control frame are free, it is also possible to separate the transmission of the integrity calculation originating from the master unit from that originating from the slave unit. Thus, the slave unit checks the integrity of the command transmitted before responding in its turn by using free bits.

In practice, the slave units connected to the bus are therefore capable of managing control messages and configuration messages, and only certain slave units will be able to manage specific control messages corresponding to their identifier.

Configuration:

Configuration takes two forms mainly:

1. The master unit scans in sequence, in all the classes of accessories, the successive identifiers and the slave unit responds to the configuration when it spots its own identifier.
2. The master unit interrogates a new entrant on the bus (a procedure may be implemented at the level of the master unit in such a way as to pass to configuration mode as soon as a new accessory is connected to the bus).

The connection of new slave units to the bus is detected automatically by virtue of a known method, for example by virtue of a method described on pages 6 and 7 of the document "Using the HC912B32 to implement the distributed systems interface (DSI) protocol" published by the company Motorola, Inc. The slave units may be placed in a parallel or looped-chain configuration.

The autodetection of new accessories should be active only in very specific phases of configuration, for example in a particular mode of programming of the slave unit, and/or for given security levels. If not, any connection of a new accessory (directly to a portion of the bus or in parallel with an already installed accessory) could allow a malicious individual to maneuver the moveable element.

Figure 5:
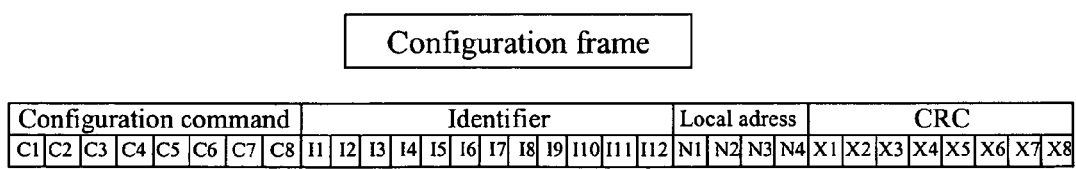
FIG. 5 is a diagram of a configuration frame emitted by the master unit.

As represented in FIG. 5, a configuration frame has a structure rather similar to a control frame.

A configuration control word on one byte provided by the master unit follows a first frame start bit (not represented).

The (unique) identifier of the slave unit which should respond to the configuration order is coded on the second byte, the third byte comprising, for its part, the local address assigned to the slave unit which should respond to the configuration message. This local address corresponds to the position of the bit associated with the accessory in a control frame. Finally, the fourth byte comprises the result of a verification calculation for the frame.

As was seen previously, the slave units are divided into two categories, a first category encompassing the slave units performing output functions and a second category performing input functions.

The slave units may also be tagged by their class, describing the product involved. A radio receiver may thus represent a first class, a push button a second class, a key contact a third class, and so on and so forth.

However, several slave units of one and the same class may be included in the installation.

Each slave unit is then also tagged by a unique code which labels it, in the installation, within its class. This unique code is for example a 4-bit suffix. The identifier of the slave unit then comprises the class code and the suffix. The class code may for example be provided to it in the factory while the suffix is chosen by the installer during installation thereof (e.g. cutting of contacts on printed circuit, positioning of multiposition switches).

The so-called input accessories thus encompass several classes and the so-called output accessories encompass another group of complementary classes.

First Case of Configuration: The Master Unit Systematically Scans the Identifiers of the System Placed in a programming mode, the master unit emits an identification message containing a possible identifier as well as a free local address. The slave unit tagged by this identifier registers the local address and responds, in the course of the transmission of this address, by sending an echo of the local address. Thus, the master unit is warned of the allocation of a local address.

Second Case of Configuration: The Master Unit Interrogates a New Entrant

Placed in a programming mode upon the introduction of a new slave unit onto the bus, the master unit emits an identification message containing a dummy address, for example, all the identifier bits set to zero. The master unit also transmits a free local address which will be assigned to the accessory, that is to say the location in the second and third bytes of the bit identifying the slave unit. In the course of the transmission of this dummy identifier, the slave unit responds by emitting a current impulse in such a way as to transmit its own identifier to the electronic unit. The slave unit also sends an echo of the local address.

In both cases, the slave unit can also send an echo of the verification code received in the fourth byte. This procedure may be repeated to confirm the transmission of the identifier.

In the configuration frame, the second byte is assigned to the class identifier, the high part of the third byte is assigned to the suffix, the low part of the third byte is assigned to the local address.

Other apportionments will be used depending on the number of different classes of products, and/or according to the number of local addresses provided for in an installation.

During configuration, it is possible to "sort" the various accessories by class, that is to say without necessarily using, for the local address of a new entrant, the first free address in the frame. The slave units encompassing, under one and the same package, several accessories (for example a photoelectric emitter/receiver), may also respond to a configuration command for a new entrant according to a well-defined order (e.g. the photoelectric emitter firstly, to the latter being assigned a local address in the first bits of the second byte, while the receiver responds secondly and such that a local address that is rather more toward the end of the frame is assigned thereto). This apportionment is particularly beneficial in the case of synchronization monitoring which will be detailed later.

Monitoring Messages:

Provision may be made for the master unit to emit, at regular intervals, messages for monitoring the slave units, so as to check the presence of the latter and their proper operation.

This procedure is necessary if the response of the slave units follows the following rule: the high state is signified by a current pulse, the low state by no current pulse. The monitoring procedure is described hereinbelow.

The control word then signals a test instead of a command. The slave units, in particular the output accessories, then optionally execute the orders transmitted without waiting for the verification of the integrity calculation.

The master unit emits a first frame intended for all or some of the slave units, in which the bits of the second and third bytes are all (or partly) in the high state. Its aim is to establish contact with certain slave units and to check their response to a particular order.

In the course of the bit which identifies it, each slave unit emits an item of information relating to its state heading for the master unit.

The master unit then emits a second control message such that the addressing bits placed in the high state in the previous command are all in the low state for example. This message is aimed at resetting the slave units to a neutral state.

In the course of the bit associated with them, the accessories respond to this message to confirm to the master unit that they have returned to their neutral state.

In a second mode of execution of the procedure for checking the operation of the slave units, the frame communicated to the slave units is based on the state of the network at the moment of the verification command. The master unit has in memory the states of the various slave units after the last command.

Upon the emission of a first verification frame, the values given on the bits associated with the slave units in the course of a first control message are the inverses of the values of the states of the slave units saved in the master unit.

In the same way as before, the slave units respond, then a second frame is emitted. The values of the bits associated with the various slave units then again take the initial values of the states of these units.

Thus, subsequent to these two verification frames, the various slave units have returned to their initial state and the master unit has been able to test the responses of the slave units whether this be in response to a low state or to a high state.

However, a rule will be preferred according to which the response of the slaves is systematic, that is to say a current pulse is systematically sent, but the shift of the latter, in time (still in the course of the transmission of the particular bit corresponding thereto) or in strength, defines the value of the state. In this case, each control message allows the master unit to monitor the various accessories of the network and additional monitoring messages are not necessary.

Synchronization:

The simplicity of the exchanges between the slave units and the master unit can make it possible to perform the synchronization of slave units rapidly.

For example, it is customary to use one or more pairs of photoelectric cells to detect the presence of a body in proximity to the moveable element when the latter is displaced.

Each pair of photoelectric cells consists of an emitter of light waves and of a receiver of these waves. The synchronization is generally necessary to avoid interference between various pairs of photoelectric cells installed close together.

Likewise, a verification of correct transmission of the luminous signal is necessary in order to verify the proper state of operation of the pair of photoelectric cells.

This synchronization is generally implemented by exchange of a synchronization signal between the pairs of photoelectric cells.

According to the invention, it is very easy to control a sequence of activity "ON" followed by inactivity "OFF" of the light wave emitter and simultaneously, to emit a request regarding the state of the light wave receiver. On account of the communication protocol, this synchronization is very fast and may be implemented before each controlled movement of the moveable element.

As it has been mentioned with regard to the monitoring messages, it is not necessary for the photoelectric cell to wait for the verification of the integrity code before executing the command in response to a monitoring or synchronization message. Thus, in the course of the transmission of the frame, the emitter photoelectric cell receives an order of high state (ON) and turns on. The actual receipt of the light beam originating from the emitting photoelectric cell causes the change of state of the receiving photoelectric cell, which may signal same when it in turn receives a state request bit in this same frame.

Figure 6:
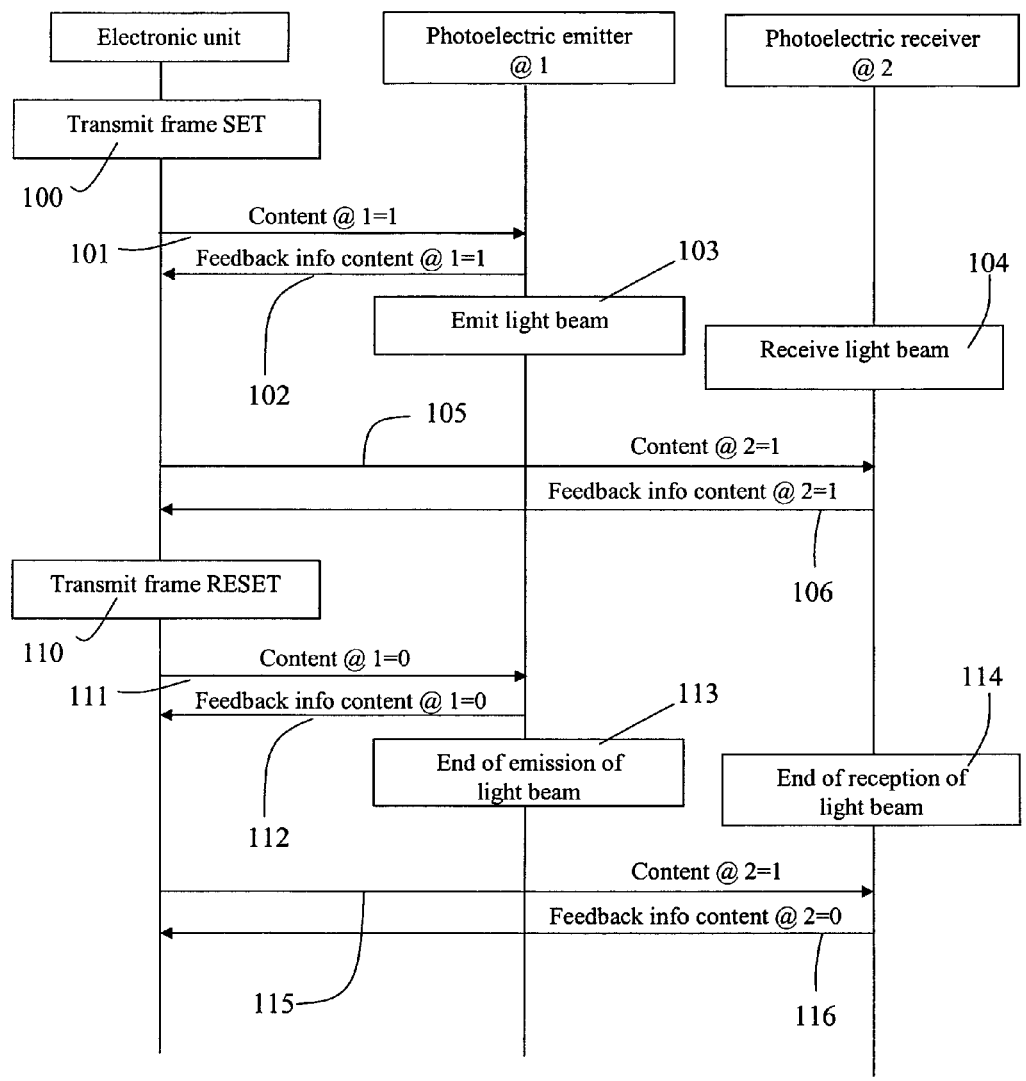
FIG. 6 is a flowchart representing a procedure for synchronizing two photoelectric security cells.

An exemplary procedure is described hereinbelow with reference to FIG. 6. In a first step represented by the arrow 100, a first frame (SET) is emitted from the master unit. This frame is received, in sequence, by all the slave units concerned and in particular by a photoelectric emitter and a photoelectric receiver each consisting of a photoelectric cell. Firstly, the photoelectric emitter receives and reads the content of the bit which is addressed to it in a step 101. On account of the (high) state of the addressing bit of this frame corresponding to the local address of the photoelectric emitter, the latter reacts by sending a current pulse during the addressing bit which is associated with it. This sending is represented by the arrow 102 and corresponds to a confirmation of the proper receipt of the order. In a step 103, the photoelectric emitter executes the order and therefore emits a light beam. On its side, the photoelectric receiver receives, in a step 104, the light beam originating from the photoelectric emitter, although it has not yet received the control frame bit addressed to it. The photoelectric receiver then modifies its state. This modification of state may for example consist of a modification of a value stored in a memory.

Simultaneously, the master unit continues the transmission of the control frame. The photoelectric receiver then receives the bit corresponding to it (step 105) and interprets the pulse received as a state request. Given the modified value that it contains in memory on account of the receipt of a luminous signal, it reacts by sending a specific current pulse during the addressing bit associated with it. This sending is represented by the arrow 106. The master unit is thus informed of the receipt by the photoelectric receiver of the beam emitted by the photoelectric emitter.

The master unit then ends the transmission of this synchronization control frame.

A new frame (RESET) is then sent in the course of a step 200. The corresponding subsequent steps are conducted according to the same diagram as for the steps 101 to 106 described above. On the other hand, the content of the bit addressed to the photoelectric emitter is in this case set to zero (step 111), the effect of which is a response of the photoelectric emitter likewise at zero (step 112) and the stopping of the emission of the light beam (step 113). The photoelectric receiver no longer receiving the beam (step 114) modifies its state, that it communicates to the master unit in response to the control frame bit addressed to it (steps 115 and 116).

Thus, subsequent to the succession of steps 100 to 116, the master unit checks the proper synchronization between the emission and the reception of the light beam between the photoelectric cells.

These steps may be iteratively repeated several times, before the controlled operation of the actuator, without this being perceptible to the user, given the speed of transmission and of response.

In this example, the order of addressing of the various accessories is obviously significant, as is the transmission bit rate in regard to the speed of reaction of the photoelectric emitter.

If the receiver has not received the light beam before the reading of the bit associated with it (or if its local address corresponds to a bit placed ahead of that of the emitter), the response containing the change of state is deferred to the next frame.

It is also possible to test the synchronization of the pair of accessories with a control message. In this case, the receiver receives the light beam only once the control frame has been transmitted completely. It does not confirm to the master unit the receipt of this message until during the next frame.

Figure 7:
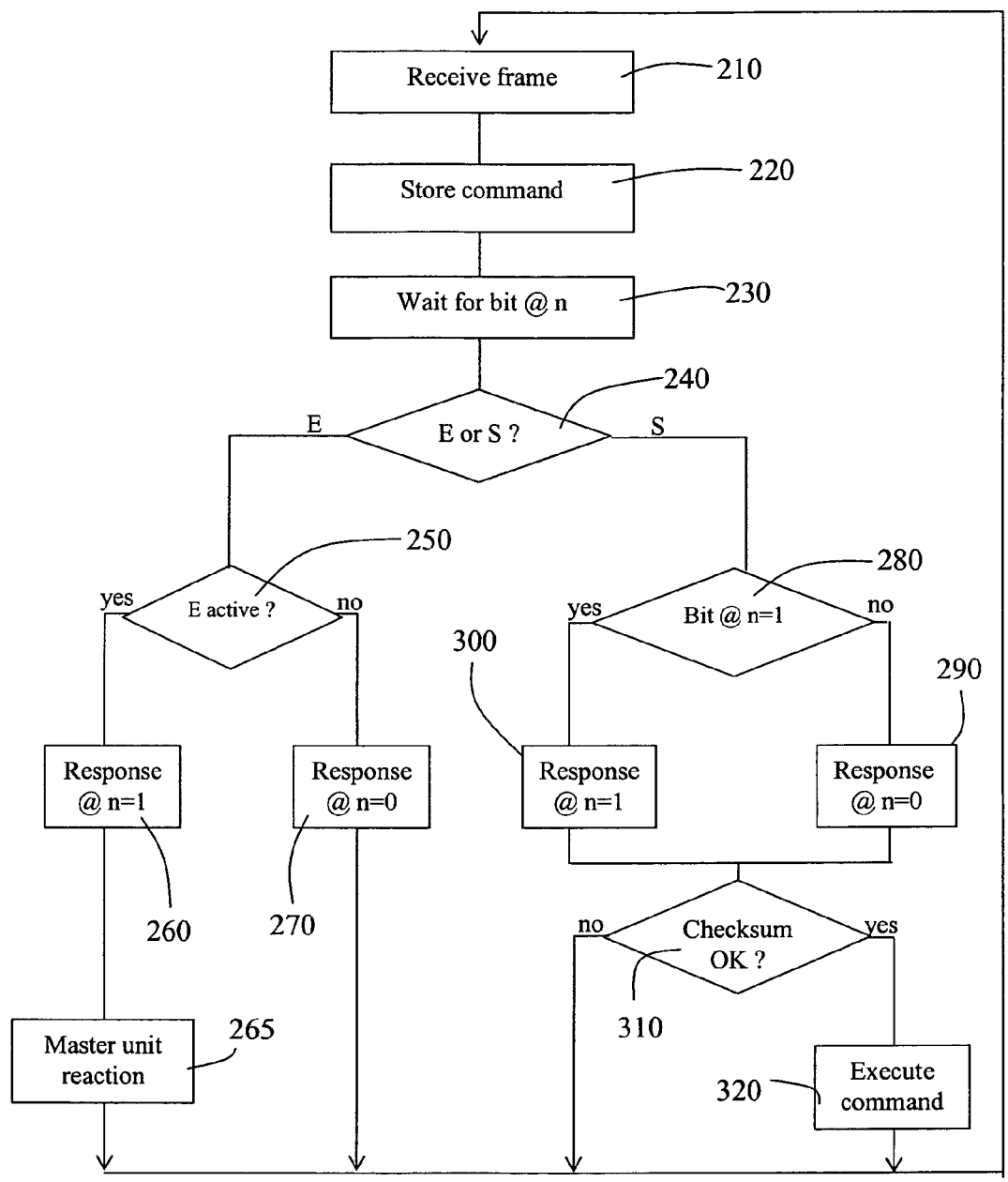
FIG. 7 is a flowchart representing the various possible reactions of the slave units to the frames emitted by the master unit, in a first variant of operation of the installation.

The flowchart of FIG. 7 represents the diverse possible reactions of the slave units to the frames emitted by the master unit.

As represented in FIG. 7, the slave units respond regardless of the value of their associated frame addressing bit. These units react to the command as a function of their category (slave unit performing input functions or slave unit performing output functions).

A slave unit performing output functions sends in the course of the transmission of the addressing bit associated with it an echo to the latter (current pulse corresponding to the state of the bit received) to confirm the receipt of the order. The master unit thus verifies whether the order that it emitted has indeed arrived at its destination with the proper value.

A slave unit performing input functions also sends a current pulse during the addressing bit associated with it. This sending depends on its state.

The position, within the transmission time of the addressing bit, of the current pulse, or possibly the strength of the current pulse, indicates the state of the slave unit.

In a first step 210, a slave unit begins receiving a frame emitted by the master unit. In a second step 220, the control bits constituting the start of this frame are placed in memory in the slave unit. In a third step 230, the slave unit begins to receive the addressing bits.

Next step occurs when the addressing bit is that associated with the unit concerned.

If the slave unit performs input functions (test 240), and if this unit is in an active state (test 250), it sends, in a step 260, a current pulse during the receipt of the addressing bit with which it is associated (starting at an instant t1 during the receipt of the addressing bit with which it is associated) to signify to the master unit its active state. This response causes, in a step 265, a reaction of the master unit (driving of an actuator, emission of a specific command, etc.).

If the slave unit performs input functions (test 240) and if this unit is in a passive state (test 250), it sends, in a step 270, a current pulse (starting at an instant t0 during the receipt of the addressing bit with which it is associated) to signify to the master unit its passive state.

This procedure allows the master unit to systematically verify that the command has indeed been recognized. Specifically, the slave units may be placed manually or automatically in an off state. If no current pulse is received in response by the master unit, the latter may then consider that the slave unit is in an off state.

If the slave unit performs output functions (test 240) and if the addressing bit with which it is associated is in the low state (test 280), it sends, in a step 290, a current pulse starting at a time t0 during the receipt of the addressing bit with which it is associated, to signify to the master unit the receipt of the frame. In a step 310, the slave unit checks the integrity of the frame emitted by calculating an image value of the first three bytes of the frame and by comparing this image with the fourth byte of the frame. If the value is equal to the value of the last byte of the frame, the command according to the state of the bit received in step 280 is executed in step 320 (for example, in the case of a lamp, the latter is turned off).

If the slave unit performs output functions (test 240) and if the addressing bit with which it is associated is in the high state (test 280), it sends, in a step 300, a current pulse starting at a time t1 during the receipt of the addressing bit with which it is associated. In a step 310, the slave unit checks the integrity of the frame emitted by calculating an image value of the first three bytes of the frame and by comparing this image with the fourth byte of the frame. If the value is equal to the value of the last byte of the frame, the command according to the state of the bit received in step 280 is executed in step 320 (for example, in the case of a lamp, the latter is turned on).

In a second case not represented, to limit the responses necessary for example in a monitoring command or for selecting certain slave units (from among those performing an input function), the latter react only if the addressing bit associated with them is equal to 1.

Thus, a slave unit performing input functions that is not selected in a frame (addressing bit associated with it is equal to 0) does not send any response to the master unit to communicate its state to it. It is thus possible to disable certain slave units from the master unit.

Finally, the teachings of the invention may be used to further simplify the protocol in the case of simple installations. A variant consists for example in deleting the first byte of the control frames. Each of the units performing input functions and performing output functions replies systematically through the duplication of its present state, doing so during the bit which concerns it.

A high state sent in the frame by the master unit is then a change of state order.

The cyclic redundancy check byte may also be omitted. In this case, any message is definitively validated only if it has been confirmed n times in the course of m consecutive transmissions (n being equal for example to 2 and m being equal for example to 3).

Likewise, other procedures could be implemented to obtain the voltage pulses from the master unit, the reading of these pulses by the slave units or else for the management of collisions.

Specific embodiments of a method of communication and home automation installation for its implementation according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method of communication in a home automation installation for motorized maneuvering of a moveable element for closure, for privacy, or for solar protection or of a screen comprising a master unit and slave units linked to electrical devices, the master unit and the slave units being connected to an information transmission bus, wherein the slave units are identified in a frame of a particular message emitted by the master unit and wherein each slave unit responds to the particular message emitted by the master unit during the duration of emission of one particular bit of this particular message.

2. The method of communication as claimed in claim 1, wherein each slave unit is identified in a frame of a message emitted by the master unit by the position of a particular bit of this frame.

3. The method of communication as claimed in claim 2, wherein the response of the slave unit intervenes in the course of the duration of emission of this particular bit.

4. The method of communication as claimed in claim 1, wherein the transmission of information from the master unit to the slave units is effected in the form of an electrical voltage modulation and the transmission of information from the slave units to the master unit is effected in the form of electrical current modulation.

5. The method of communication as claimed in claim 4, wherein the transmission of information from the master unit to the slave units is effected in the form of an ac electrical voltage modulation.

6. The method of communication as claimed in claim 4, wherein a value of a current pulse transmitted by a slave unit depends on a strength of the current pulse flowing in the bus or a temporal shift of this current pulse.

7. The method of communication as claimed in claim 1, wherein the identification of a slave unit in a frame of a message is defined during the transmission of a local address in a configuration frame.

8. The method of communication as claimed in claim 1, wherein a message frame transmitted by the master unit to a slave unit performing an output function comprises an order of state of an electrical device linked to this slave unit.

9. The method of communication as claimed in claim 8, wherein the slave unit responds to the order of the master unit with a signal which is the image of the order of state emitted.

10. The method of communication as claimed in claim 1, wherein a message frame transmitted by the master unit to a slave unit performing an input function comprises a request of state of an electrical device linked to this slave unit.

11. The method of communication as claimed in claim 10, wherein the slave unit responds to the request of the master unit with a signal which is the image of the state of the electrical device linked to this slave unit.

12. A home automation installation for motorized maneuvering of a moveable element for closure, for privacy or for solar protection or of a screen comprising a master unit and at least one slave unit linked to an electrical device, the master unit and the slave unit(s) being connected to an information transmission bus, which comprises hardware means and software means for the implementation of the method of communication as claimed in claim 1.

13. The installation as claimed in claim 12, wherein the information transmission bus also allows the supplying of the slave units from the master unit.

14. The installation as claimed in claim 12, wherein the master unit controls the supply to an electric motor.

15. A master unit controlling the supply to an electric motor for maneuvering a moveable element for closure, for privacy or for solar protection or a screen and intended to be linked to an electrical energy and information transmission bus, comprising a dc voltage generator and a microcontroller, which comprises an inverter circuit whose output is intended to be linked to the bus and whose input is linked to the dc voltage generator though a current measurement element, the inverter circuit being commanded by the microcontroller and which comprises hardware means and software means for the implementation of the method of communication as claimed in claim 1.

16. A slave unit intended to be linked on the one hand to an electrical energy and information transmission bus and, on the other hand, to an electrical device for controlling movement of a motor or to an electrical device for controlling movement of a motor or to an electrical information device or to an electrical security device, which comprises hardware means and software means for the implementation of the method for communication as claimed in claim 1.

* * * * *